United States Patent
Benco et al.

(10) Patent No.: US 7,577,241 B2
(45) Date of Patent: Aug. 18, 2009

(54) NETWORK SUPPORT FOR CALL DETAIL RECORD SUPPRESSION

(75) Inventors: David S. Benco, Winfield, IL (US);
Sanjeev Mahajan, Naperville, IL (US);
Baoling S. Sheen, Naperville, IL (US);
Sandra Lynn True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 754 days.

(21) Appl. No.: 11/094,402

(22) Filed: Mar. 30, 2005

(65) Prior Publication Data
US 2006/0227947 A1    Oct. 12, 2006

(51) Int. Cl.
*H04M 15/00* (2006.01)
(52) U.S. Cl. .............. 379/127.02; 379/114.01; 379/114.03; 379/114.28; 379/126; 379/201.11; 455/405; 455/406
(58) Field of Classification Search .......... 379/114.01, 379/114.03, 114.05, 114.21, 114.28, 121.05, 379/126, 127.02, 201.11; 455/405, 406
See application file for complete search history.

(56) References Cited

U.S. PATENT DOCUMENTS

| 5,218,632 A | * | 6/1993 | Cool | 379/126 |
| 5,835,856 A | * | 11/1998 | Patel | 455/406 |
| 6,055,306 A | * | 4/2000 | Lozinski et al. | 379/230 |

* cited by examiner

*Primary Examiner*—Fan Tsang
*Assistant Examiner*—Hemant Patel

(57) ABSTRACT

A method is provided for supporting a call record suppression feature in a telecommunications network (30). The method includes: handling a call for an end user terminal (10) served by a facility (20) of the telecommunications network (30); determining if the call record suppression feature is active for the end user terminal (10); processing a call record for the handled call if it is determined that the call record suppression feature is not active for the end user terminal (10); and, suppressing the processing of the call record if it is determined that the call record suppression feature is active for the end user terminal (10).

20 Claims, 2 Drawing Sheets

NETWORK SUPPORT FOR CALL DETAIL RECORD SUPPRESSION

FIELD

The present inventive subject matter relates to the telecommunication arts. Particular application is found in conjunction with certain types of telecommunication networks, and the specification makes particular reference thereto. However, it is to be appreciated that aspects of the present inventive subject matter are also amenable to other like applications and/or networks.

BACKGROUND

Wide spread usage of mobile terminals (e.g., mobile or wireless telephones) is reflected across many sections of society, e.g., business, government, personal, etc. In some instances, for example, government, law enforcement, military and/or other applications, it is desired to have secret or otherwise clandestine communications using mobile telephones. At times, it is desired to obstruct or block subsequent tracking of calls to or from a particular mobile telephone. Likewise, it may be desired to conduct similar calls using a landline or wireline terminal or telephone.

However, in the usual course of call connections over the public switched telephone network (PSTN) and/or public wireless or mobile telecommunications networks, there are typically generated certain records that can be used to track calls to and/or from particular end user terminals, be they mobile terminals or landline terminals. For example, typically, a mobile switching center (MSC) serving a mobile station (MS) (i.e., a mobile telephone or other mobile terminal) is equipped with a call detail recording (CDR) system or the like. Similarly, an end office (EO) serving a landline terminal or telephone may, e.g., be equipped with a class 5 telecommunications switch such as the 5ESS, and may also typically be equipped with and/or employ an automatic message accounting (AMA) system or the like. Systems such as a CDR system, an AMA system and other like systems generate a call detail record (CDR) or other like record for each call processed, connected and/or otherwise handled for an end user terminal (such a telephone or another like end user device (EUD) or customer premise equipment (CPE)) served by the MSC, EO or other like telecommunication facility or entity. The generated CDRs or other records are commonly stored for a period of time, e.g., so that they may be periodically collected and used for billing and/or accounting purposes by the telephone company or telecommunications service provider. A CDR or other like call record typically includes such information as: a calling party or call origination identifier, e.g., the telephone number of the calling party or originating terminal, a called party or call termination identifier, e.g., the telephone number of the called party or terminating terminal, a start time of the call, an end time of the call, a duration of the call, etc. Optionally, other information may also be included in the record depending on the type of call, the record generating system employed, the type of facility producing the record, etc. This additional information may include, e.g., the quality of service for the call, signal strength, the cell used, the identity of the terminating and/or originating switch, etc.

As can be appreciated, the generation and/or maintenance of CDRs and/or other like records leaves a trail that can be tracked and/or otherwise used to determine when calls were made to and/or from a particular end user terminal or telephone, and where those calls were placed to and/or from. These records and/or their trail potentially exposes or compromises communications which in certain applications a subscriber or user of the terminal or telephone otherwise desires to keep secret or generally unknown to outside persons. For example, the subscriber or user of a mobile or landline terminal may not want even the telephone company to be able to subsequently track when or where calls where made to or from their terminal. Accordingly, it would be advantageous to have a feature or service capable of suppressing the generation of CDRs and/or other like records for calls originating or terminating from an end user terminal (e.g., a mobile telephone) having such a feature or service activated.

Accordingly, a new and improved CDR suppression service and/or feature is disclosed that overcomes the above-referenced problems and others.

SUMMARY

In accordance with one embodiment, a method is provided for supporting a call record suppression feature in a telecommunications network. The method includes: handling a call for an end user terminal served by a facility of the telecommunications network; determining if the call record suppression feature is active for the end user terminal; processing a call record for the handled call if it is determined that the call record suppression feature is not active for the end user terminal; and, suppressing the processing of the call record if it is determined that the call record suppression feature is active for the end user terminal.

In accordance with another embodiment, a system for supporting a call record suppression service in a telecommunications network includes: a facility operatively connected to the telecommunications network, the facility handling a call for an end user terminal served by the facility; determining means for determining if the end user terminal subscribes to the call record suppression service; processing means for processing a call record for the call handled by the facility if it is determined that the end user terminal does not subscribe to the call record suppression service; and, suppression means for suppressing the processing of the call record if it is determined that the end user terminal does subscribe to the call record suppression service.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/ or services, and other components that are commonly known in the telecommunications art without further detailed explanation as to their configuration or operation except to the extent they have been modified or altered in accordance with and/or to accommodate the preferred embodiment(s) presented herein.

Figure 1:
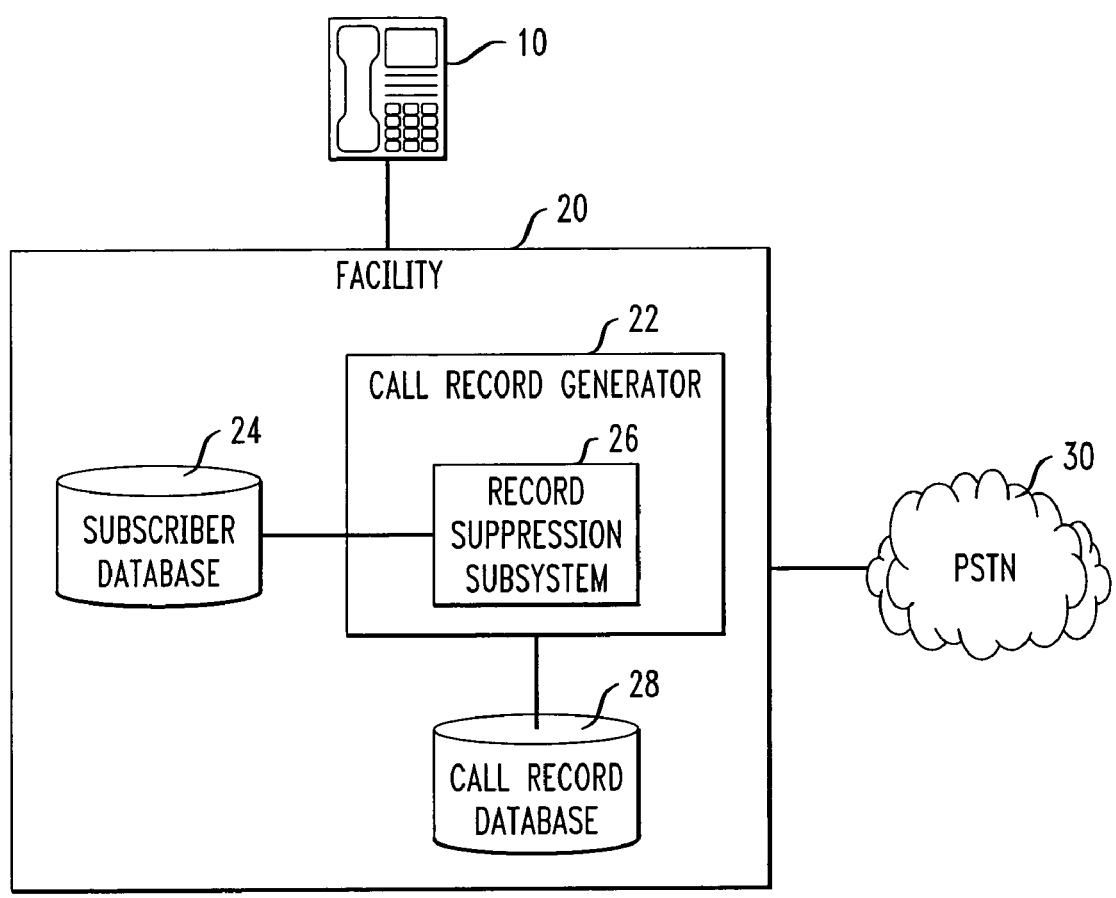
FIG. 1 is a block diagram illustrating an exemplary telecommunications network suitable for practicing aspects of the present inventive subject matter.

With reference to FIG. 1, a user or subscriber uses an end user terminal 10 to selectively place telephone calls over a telecommunications network. Suitably, the terminal 10 is served by a telecommunications facility 20 that is operatively connected to and/or in communication with a public switched telephone network (PSTN) 30 in the usual manner. As shown, the facility 20 is equipped with and/or otherwise has access to a call record generator 22, a subscriber database 24, a suppression subsystem 26, and a call record DB 28. While for simplicity and clarity herein only one terminal 10 and facility 20 are illustrated in the present example, it is to be appreciated that a single facility 20 suitably serves a plurality of similarly situated terminals and that a plurality of such facilities are similarly equipped and/or likewise arranged with respect to the PSTN 30.

For example, in a landline or wireline application, the terminal 10 is optionally a landline telephone or other like end user telecommunication device or landline CPE, and the facility 20 serving the terminal 10 is an end office (EO) that is operatively connected to the PSTN 30 in the usual manner. Suitably, the EO includes a telecommunications switch (e.g., a class 5 switch such as the 5ESS or another like switch) to which the terminal 10 is operatively connected in the usual manner, e.g., via a twisted-pair landline cable or the like. In the landline or wireline embodiment, the call record generator 22 is suitably an automatic message accounting (AMA) system or the like.

In a wireless or mobile application, e.g., the facility 20 serving the terminal 10 is a MSC operatively connected to and/or in communication with the PSTN 30 in the usual manner. Suitably, the MSC is also operatively connected to and/or in communication with a plurality of base stations (not shown) in the usual manner. As is understood in the art, each base station (BS) provides an over-the-air radio frequency interface for its respective geographic area or cell. Selectively, the terminal 10 (which in this embodiment is a mobile or wireless telephone or other appropriate MS) is provided telecommunication services and/or otherwise accesses the network via the interface and/or the BS serving the cell in which the MS is located. In the wireless or mobile embodiment, the call record generator 22 is suitably a call detail recording (CDR) system or the like.

In the normal course of processing, connecting and/or otherwise handling calls to and/or from the terminal 10, the facility 20 employs the call record generator 22 (be it an CDR system, an AMA system or another like system) in the usual manner to produce a typical call detail record (CDR) and/or other like record for each call. The generated CDRs or other records are normally stored for a period of time, e.g., in the call record DB 28. Suitably, as is known in the art, the records may be periodically collected from the call record DB 28 and used for billing and/or accounting purposes by a telephone company or telecommunications service provider operating the facility 20. A CDR or other like record produced by the call record generator 22 and/or stored in the call record DB 28 optionally includes such information as: a calling party or call origination identifier, e.g., the telephone number of the calling party or originating terminal, a called party or call termination identifier, e.g., the telephone number of the called party or terminating terminal, a start time of the call, an end time of the call, a duration of the call, etc. Optionally, other information may also be included in the record depending on the type of call, the record generating system employed, the type of facility producing the record, etc. This additional information may include, e.g., the quality of service for the call, signal strength, the cell used, the identity of the terminating and/or originating switch, etc.

The facility 20 also includes and/or has access to a suppression service or feature that selectively blocks, suppresses or otherwise prevents the generation and/or storage of CDRs and/or other like records. As shown the suppression service or feature, is provided by the suppression subsystem 26 which is a subsystem of the call record generator 22. However, the suppression feature or service is optionally provided by an independent system. Upon verification of a proper subscription to or activation of the suppression feature or service by either the calling party or originating terminal or the called party or terminating terminal, the suppression subsystem 26 overrides or otherwise controls the operation of the call record generator 22 to prevent production of a CDR or other like record for the call in question. Alternately, the suppression subsystem 26 prevents a targeted CDR or other like record from being stored in the call record DB 28.

As desired by the user or subscriber or as otherwise selected, the terminal 10 (or its user) may or may not have a subscription to or otherwise have activated the suppression feature or service. For example, the subscriber DB 24 optionally has a list stored therein, and/or otherwise maintains data or information that indicates, which terminals and/or users (e.g., identified by their telephone numbers or other like identifiers) do and/or do not subscribe to and/or have activated the suppression feature or service. Suitably, the subscriber and/or activation status for the terminal 10 is so listed or indicated in the subscriber DB 24.

Figure 2:
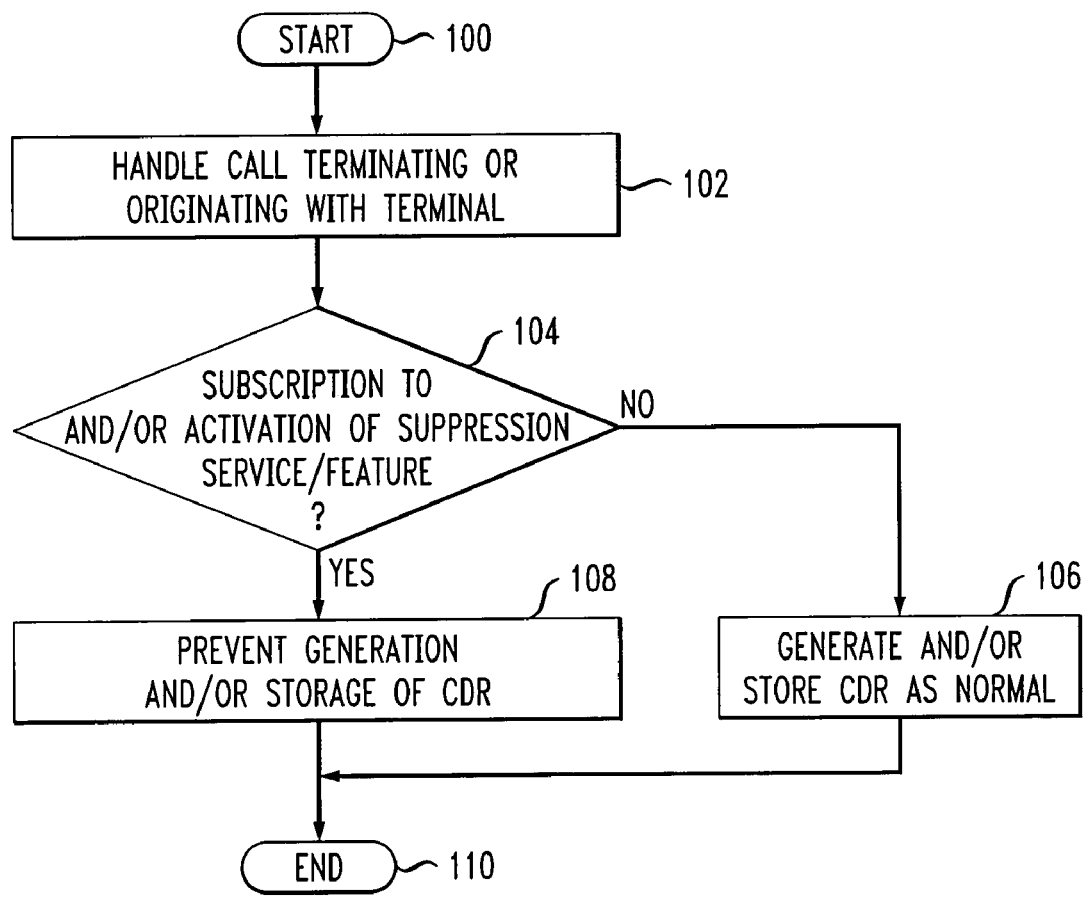
FIG. 2 is a flow chart showing an exemplary CDR suppression process embodying aspects of the present inventive subject matter.

With reference to FIG. 2, operation of the suppression feature and/or service will now be described. The process starts at step 100. At step 102 is shown the facility 20 processing, connecting or otherwise handling a call that terminates or originates with a terminal served by the facility 20. At decision step 104, the suppression subsystem 26 determines if the call is to or from (i.e., if it originated with or terminated with) a terminal that has a subscription to and/or activation of the suppression service/feature. For example, the suppression subsystem 26 optionally queries or otherwise accesses the subscriber DB 24 to obtain the pertinent subscription status and/or activation information, optionally, for both the originating and terminating terminals involved in the call. Suitably, the call record generator 22 may have already obtained the data for and/or provisionally created the CDR or other like record prior to step 104. Accordingly, the telephone number or other identifier for the calling party or call origination terminal and the telephone number or other identifier for the called party or call termination terminal are available to the subsystem 26 which may optionally access the same and use them to query the DB 24. Alternately, the subsystem 26 uses and/or accesses other known devices and/or mechanisms to obtain the relevant telephone numbers and/or party identifiers for the terminals involved in the call, e.g., automatic line identification (ALI), caller ID, etc.

If at step 104, it is determined that the suppression feature or service is not subscribed to or activated for either terminal involved in the call, then at step 106 the suppression subsystem 26 allows the normal generation and storage of the CDR or other like record by the call record generator 22 and the call record DB 28, respectively. Alternately, if at step 104, it is determined that the suppression feature or service is subscribed to or activated for either terminal involved in the call, then at step 108 the suppression subsystem 26 prevents the normal generation and/or storage of the CDR or other like record by the call record generator 22 and the call record DB 28, respectively. Finally, at step 110, the process ends.

Optionally, at step 108, the suppression subsystem 26 overrides or otherwise controls the operation of the call record generator 22 to prevent production of the CDR or other like record. If a CDR or other like record has already been provisionally created by the generator 22, the suppression subsystem 26 optionally directs the generator 22 to discard, erase or otherwise eliminate it. Alternately, the subsystem 26 filters CDRs or other like records created by the generator 22 as they are transferred to the call record DB 28, discarding, eliminating or otherwise erasing those targeted CDRs or other like records before they are stored in the DB 28. Suitably, targeted CDRs or other like records are identified by the subsystem 26 using originating and terminating terminal ids or telephone numbers contained in the record. When an id or telephone number obtained from a record by the subsystem 26 is found to match an id or telephone number in the subscriber DB 24 indicated as subscribing to and/or having activated the suppression feature/service, then the offending CDR or other like record is filtered by the suppression subsystem 26 out of the stream of records being sent from the generator 22 to the call record DB 28. Accordingly, only unsuppressed records reach the DB 28 for storage therein.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of supporting a call record suppression feature in a telecommunications network, said method comprising:
   (a) handling a call for an end user terminal served by a facility of the telecommunications network;
   (b) determining if the call record suppression feature suppressing the processing of a call detail record is active for the end user terminal;
   (c) processing a call detail record for the handled call if it is determined that the call record suppression feature is not active for the end user terminal; and,
   (d) suppressing the processing of the call detail record if it is determined that the call record suppression feature is active for the end user terminal thereby leaving no available record of the call.

2. The method of claim 1, wherein the processing of step (c) comprises:
   generating the call detail record; and,
   storing the call detail record.

3. The method of claim 2, wherein the suppressing of step (d) comprises:
   blocking the generating of the call detail record.

4. The method of claim 3, wherein the telecommunications network is a public switched telephone network.

5. The method of claim 4, wherein the end user terminal is landline customer premises equipment and the facility is an end office.

6. The method of claim 4, wherein the end user terminal is a mobile station and the facility is a mobile switching center.

7. The method of claim 1, further comprising:
   maintaining a database containing information indicating whether or not the call record suppression feature is active for the end user terminal; and,
   wherein step (b) includes accessing said database.

8. The method of claim 1, wherein the handled call terminates with the end user terminal.

9. The method of claim 1, wherein the handled call originates from the end user terminal.

10. A system for supporting a call record suppression service in a telecommunications network, said system comprising:
    a facility operatively connected to the telecommunications network, said facility handling a call for an end user terminal served by the facility;
    determining means for determining if the end user terminal subscribes to the call record suppression service suppressing the processing of a call detail record;
    processing means for processing a call detail record for the call handled by the facility if it is determined that the end user terminal does not subscribe to the call record suppression service; and,
    suppression means for suppressing the processing of the call detail record if it is determined that the end user terminal does subscribe to the call record suppression service, thereby leaving no available record of the call.

11. The system of claim 10, wherein the processing means includes:
    generating means for generating the call detail record; and,
    storing means for storing the call detail record.

12. The system of claim 11, wherein the suppressing means prevents the generating means from generating the call detail record.

13. The system of claim 11, wherein the suppressing means prevents the storing means from storing the call detail record.

14. The system of claim 10, wherein the telecommunications network is a public switched telephone network.

15. The system of claim 14, wherein the facility is an end office equipped with a telecommunications switch, the end user terminal is customer premises equipment operatively connected to the telecommunications switch via a landline, and the processing means includes an automatic message accounting system.

16. The system of claim 14, wherein the facility is a mobile switching center, the end user terminal is a mobile station that interfaces wirelessly with a base station operatively connected to the mobile switching center, and the processing means includes a call detail recording system.

17. The system of claim 10, further comprising:
a subscriber database containing information indicating whether or not the end user terminal subscribes to the call record suppression service, wherein said database is accessed by the determining means to make its determination.

18. The system of claim 10, wherein the call handled by the facility terminates with the end user terminal.

19. The system of claim 10, wherein the call handled by the facility originates from the end user terminal.

20. The method of claim 2, wherein the suppressing of step (d) comprises:
blocking the storing of the call detail record.

* * * * *

UNITED STATES PATENT AND TRADEMARK OFFICE
CERTIFICATE OF CORRECTION

PATENT NO. : 7,577,241 B2 Page 1 of 1
APPLICATION NO. : 11/094402
DATED : August 18, 2009
INVENTOR(S) : Benco et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Seventh Day of September, 2010

David J. Kappos
*Director of the United States Patent and Trademark Office*